United States Patent [19]

Romero Lledo et al.

[11] Patent Number: 4,878,577
[45] Date of Patent: Nov. 7, 1989

[54] PEG FOR OVERHEAD TROUSER CONVEYOR

[75] Inventors: Antonio Romero Lledo; Fernando Diaz Zorita; Juan Cristos, all of Madrid, Spain

[73] Assignee: Investronica, S.A., Madrid, Spain

[21] Appl. No.: 267,756

[22] Filed: Nov. 1, 1988

Related U.S. Application Data

[63] Continuation of Ser. No. 117,629, Nov. 5, 1987, abandoned.

[51] Int. Cl.[4] .............................................. B65G 29/00
[52] U.S. Cl. .................................. 198/803.9; 294/104; 248/316.2
[58] Field of Search ............... 198/803.1, 803.7, 803.8, 198/470.1, 465.4; 294/104, 103.1, 81.6, 143; 211/45, 89; 248/339, 340, 316.2, 316.6

[56] References Cited

U.S. PATENT DOCUMENTS

| | | | |
|---|---|---|---|
| 2,625,707 | 4/1950 | Liittjohann | 198/803.7 X |
| 3,960,264 | 6/1976 | Larbine et al. | 294/104 |
| 4,167,996 | 9/1979 | Cutter | 198/803.3 X |
| 4,174,060 | 11/1979 | Porat | 294/103.1 X |
| 4,327,944 | 5/1982 | Langloy | 294/104 X |
| 4,519,509 | 5/1985 | Doyle | 198/803.7 X |
| 4,647,098 | 3/1987 | Hoyer et al. | 294/104 X |
| 4,727,979 | 3/1988 | Wolfson et al. | 198/803,7 X |

Primary Examiner—Robert J. Spar
Assistant Examiner—James R. Bidwell
Attorney, Agent, or Firm—Kenyon & Kenyon

[57] ABSTRACT

A peg is provided for use in overhead conveyors for carrying trousers between work stations in an industrial pressing process. The body of the peg comprises an elongated rigid base having preferably two inverted V-shaped plates and twp strips secured thereto. An elongated rectangular prism, having two contact surfaces, is located within the legs of the inverted V-shaped plates and is secured by means of handles passing through each of the strips. A respective contact surface of the rectangular prism can be tilted from one of the legs of the inverted V-shaped plates to the other. A cylindrical rod is attached at one end to the rigid base by means that enable the rod and the peg body to rotate independently against each other. The other end of the rod is in the form of a hook which is connected to the overhead conveyor.

7 Claims, 4 Drawing Sheets

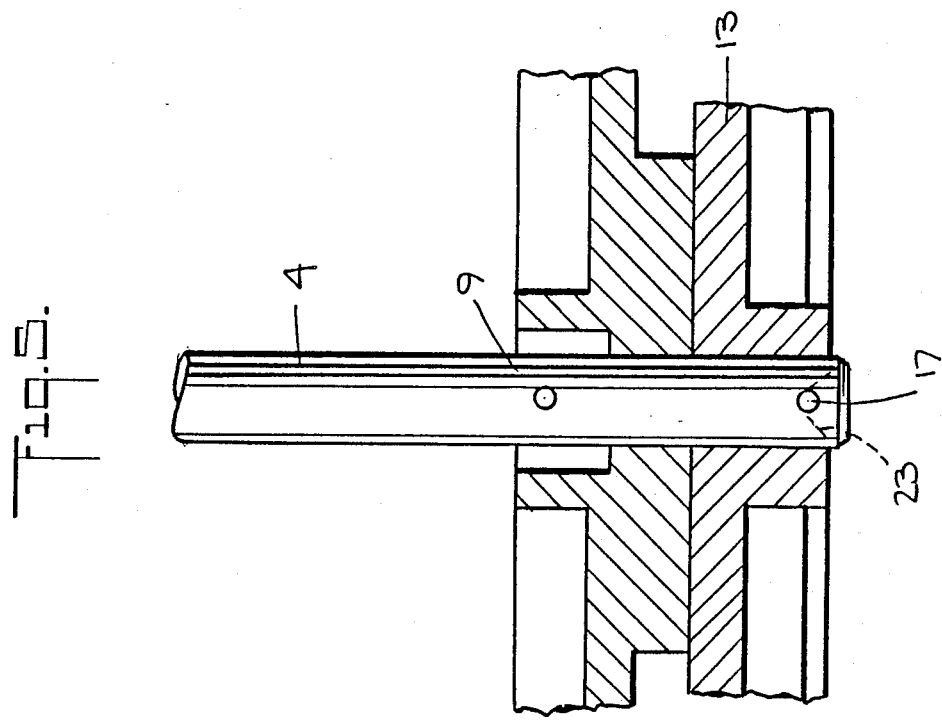
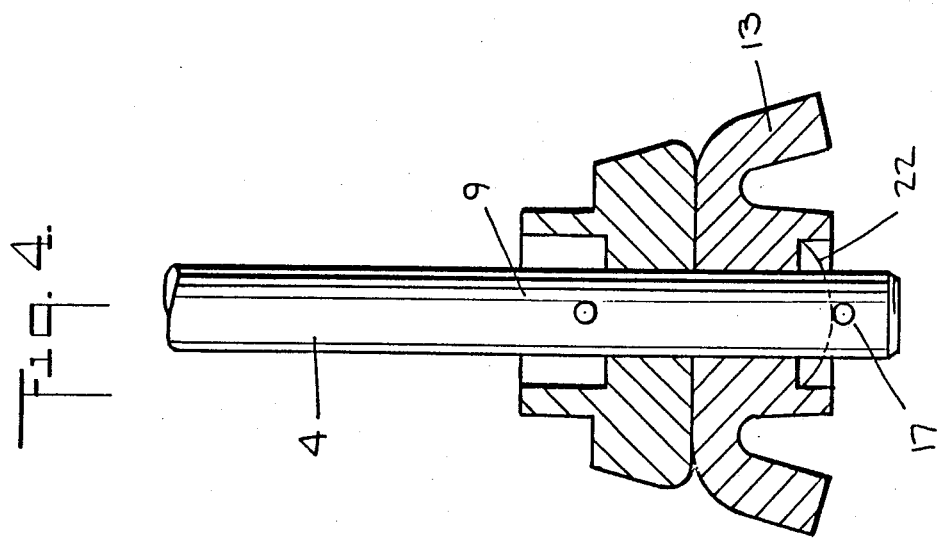

PEG FOR OVERHEAD TROUSER CONVEYOR

This application is a continuation, of application Ser. No. 117,629 filed Nov. 5, 1987, now abandoned.

FIELD OF THE INVENTION

This invention relates to a peg for use in overhead conveyors for carrying trousers between work stations in an industrial pressing process.

The peg of the invention includes a hook made up of a cylindrical rod which is attached to the body of the peg at one end, so as to enable the hook and body to rotate against each other. The other end is shaped in such a way as to enable it to be slung from the overhead conveyor.

In a preferred embodiment of the present invention, the body of the peg is made up of two rigid pieces which secure two inverted V-shaped plates and two strips, to which a rectangular prism is attached, using handles, enabling the rectangular prism to tilt from one side of the plates to the other.

BACKGROUND OF THE INVENTION

The rotary peg of the invention is especially designed to hang trousers during their pressing process, allowing them to be fastened to an overhead conveyor which carries the trousers from one work station to another. In particular, it refers to the trousers' pleating, thus involving a considerable improvement over those already in existence, since it makes it possible to press the entire garment without having at any time to take the garment down during the pressing process.

Normally, the process for the pressing of a pair of trousers involves two operations, one for the legs and the other for the upper section. Both these operations are carried out at different work stations.

The tailoring industry uses a variety of methods for carrying garments from one work station to another. One such method is with an overhead conveyor which incorporates a system of overhead rails, work stations, entry turn-outs to the work stations, carriages running on the rails, and hangers or pegs slung from the carriages. In addition, the hangers or pegs have devices for holding the garments or panels.

For trouser pressing, the peg must be able to hold different shaped trousers, with different sizes and thickness of fabric. The peg must allow the trouser hanging and release operation to be quick and easy, it must be possible to press the garment without removing it from the hanger, it must be possible to turn the trousers so as to easily press the two legs, and it must make it possible to reverse the trousers quickly and easily after the first operation in order to carry out the second. In addition, because of the large number of pegs required, the design must be simple, economical and reliable.

OBJECTS OF THE INVENTION

It is an object of the present invention to provide a peg construction which meets the foregoing specifications.

These and other objects of the present invention will become apparent from the following description and claims in conjunction with the drawings.

SUMMARY OF THE INVENTION

This invention is directed to a peg for overhead conveyor systems for carrying trousers from one working station to another in a pressing process, and includes a mechanism which allows the garment to remain hung from the peg throughout the entire pressing process. More specifically, the invention is directed to the mechanism for holding the trousers in position.

The present invention may be generally summarized as a peg for an overhead conveyor used in a pressing process for conveying a workpiece, such as trousers, from one work station to another work station. The peg comprises an elongated rigid base member suitably comprised of upper and lower rigid parts connected to one another. An inverted V-shaped plate member, suitably two inverted V-shaped plate members, is connected at its top to the rigid base member with the first and second legs of the V-shaped plate member extending downwardly from the base member. A first and second strip member are respectively connected to the first and second ends of the rigid base member and extend downwardly from the rigid base member. An elongated rectangular prism member is disposed between the first and second legs of the inverted V-shaped plate member and extends substantially parallel to the elongated rigid base member. Two adjacent surfaces on the elongated rectangular prism member define contact surfaces. The contact surfaces are preferably serrated surfaces. The elongated rectangular prism member is mounted to the first and second strip members by means permitting selective tilting or rotating of the first contact surface adjacent the first leg of the V-shaped plate member or the second contact surface adjacent the second leg of the V-shaped plate member.

The base member is mounted to the overhead conveyor by means which perferably include a cylindrical rod having a hook at one end thereof for connection to the overhead conveyor. The rod is suitably connected to the base member by means which permit the rod and the base member to rotate independently with respect to one another and which means provides for only one stable position.

BRIEF DESCRIPTION OF THE DRAWINGS

FIG. 4 is a vertical cross-section of the part 13 seen from A, and taken along the line 20—20 in FIG. 2.

FIG. 5 is a vertical cross-section of the part 13 seen from B, and taken along the line 21—21 in FIG. 3.

DETAILED DESCRIPTION

In order to provide a more complete understanding of the present invention and an appreciation of its advantages, a description of a preferred embodiment will be provided in conjunction with the figures of the drawings.

Figure 1:
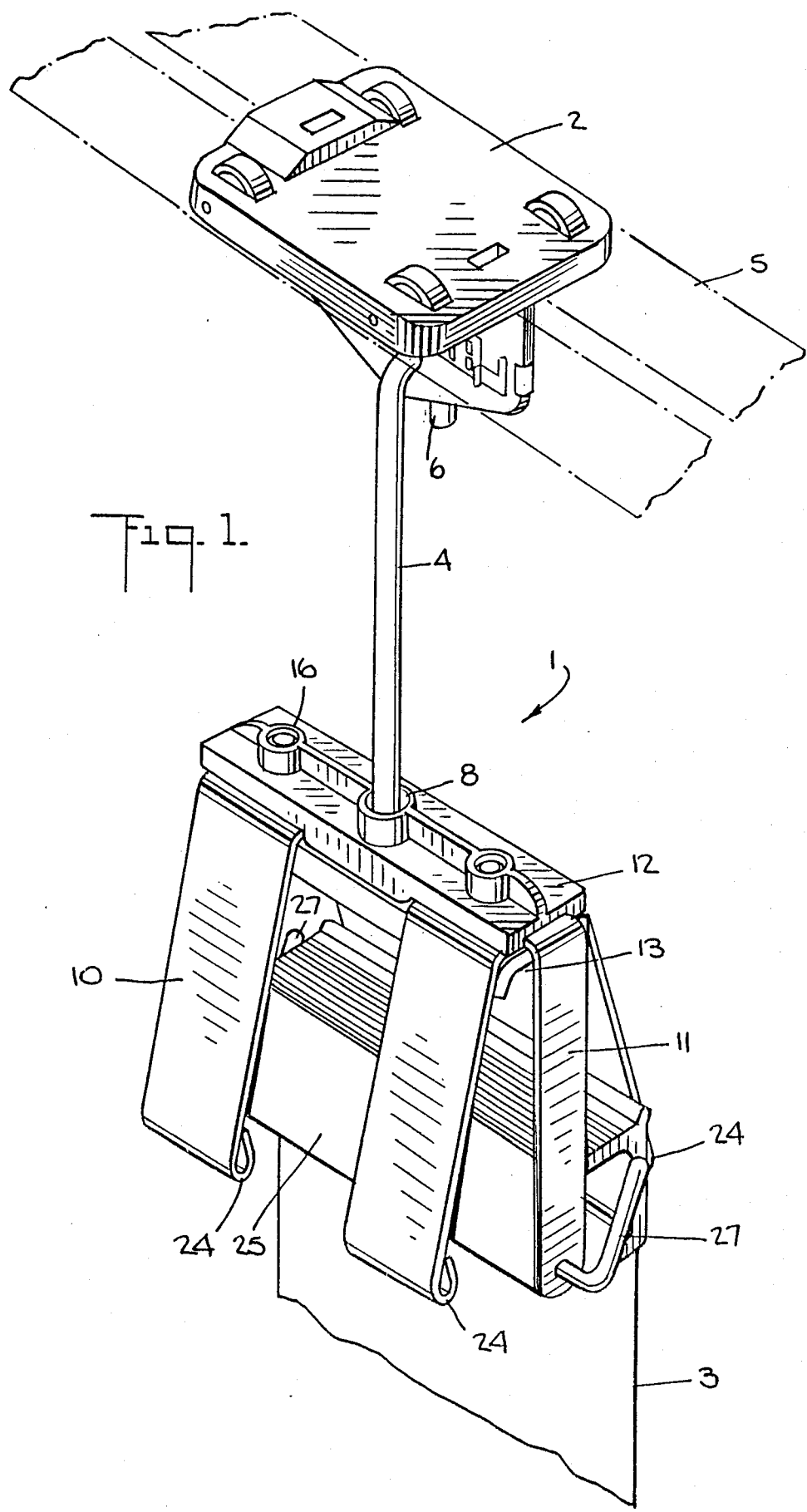
FIG. 1 is a perspective view of one embodiment of a peg, in accordance with the present invention, slung from a conveyor system and holding a pleated trouser.

FIG. 1 shows a perspective view of a preferred embodiment of peg 1, to which this invention is directed, slung from a carriage 2 which forms part of an overhead conveyor system 5 for carrying pairs of trousers 3 from one work station to another in a pressing process.

The peg 1 is connected to the overhead conveyor 5 by means of a hook 4. The hook is a cylindrical rod shaped at one end 6 in such a way as to allow it to be slung from the overhead conveyor system 5. The shape of end 6 will depend on the nature of the overhead conveyor system.

Figure 2:
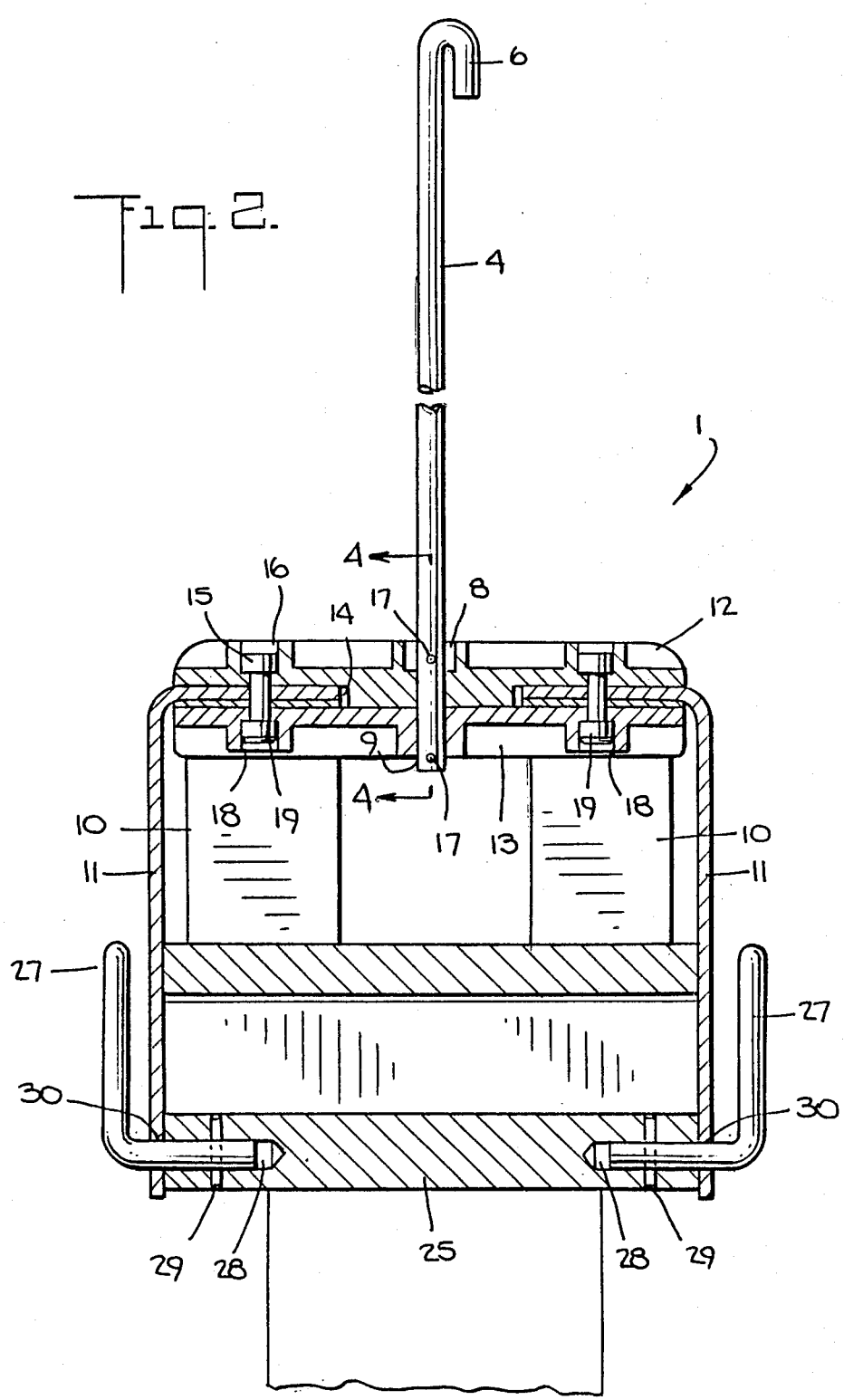
FIG. 2 is a frontal elevation view, partially in cross-section, of the peg in FIG. 1.

The other end 7 of hook 4 is introduced into the body of the peg 1 through openings 8 and 9. See FIG. 2. This end 7 has two openings 17 for two pins. In this way, the hook 4 is joined to the body of peg 1, allowing the two to rotate against each other.

The body of the peg is made up by two inverted V-shaped plates 10, two squared strips 11, and two rigid parts 12 and 13 which solidly unite the plates 10 and squared strips 11 under the pressure from bolts 15. The two inverted V-shaped plates 10 are suitably of flexible construction.

On the bottom side ends, upper rigid part 12 has two slots 14 which are suitably shaped so as to admit the plates 10 and the squared strips 11. In addition, there are two holes 16 shaped so as to admit bolts 15. The upper part of the said holes 16 is wider than the lower part, so as to house the head of bolts 15. A hole 8 through which to pass hook 4 is wider at the top than at the bottom so as to admit the pin in the upper hole 17.

Lower rigid part 13 has three holes. The two holes 18 are aligned with those in upper part 12. Holes 18 are suitably shaped to admit the nut 19 on bolts 15. The two bolts 15, together with the nuts 19 provide the pressure required to keep the entire body of the peg rigid.

The hole 9 in lower rigid part 13 has a specially shaped surface at its bottom end, as can be seen in FIGS. 4 and 5. This surface is formed by a rotating half-cylinder 22 in which two inclined plane cuts 23 are made. This surface means that it is easy to turn the hook 4 in relation to the body of the peg and vice versa. Moreover, it has the particular feature that there is only one suitable position, namely the one shown in FIG. 1. The stable position is necessary so that, during overhead movement, the trousers do not turn freely and so do not hook into other components of the overhead conveyor system.

Figure 3:
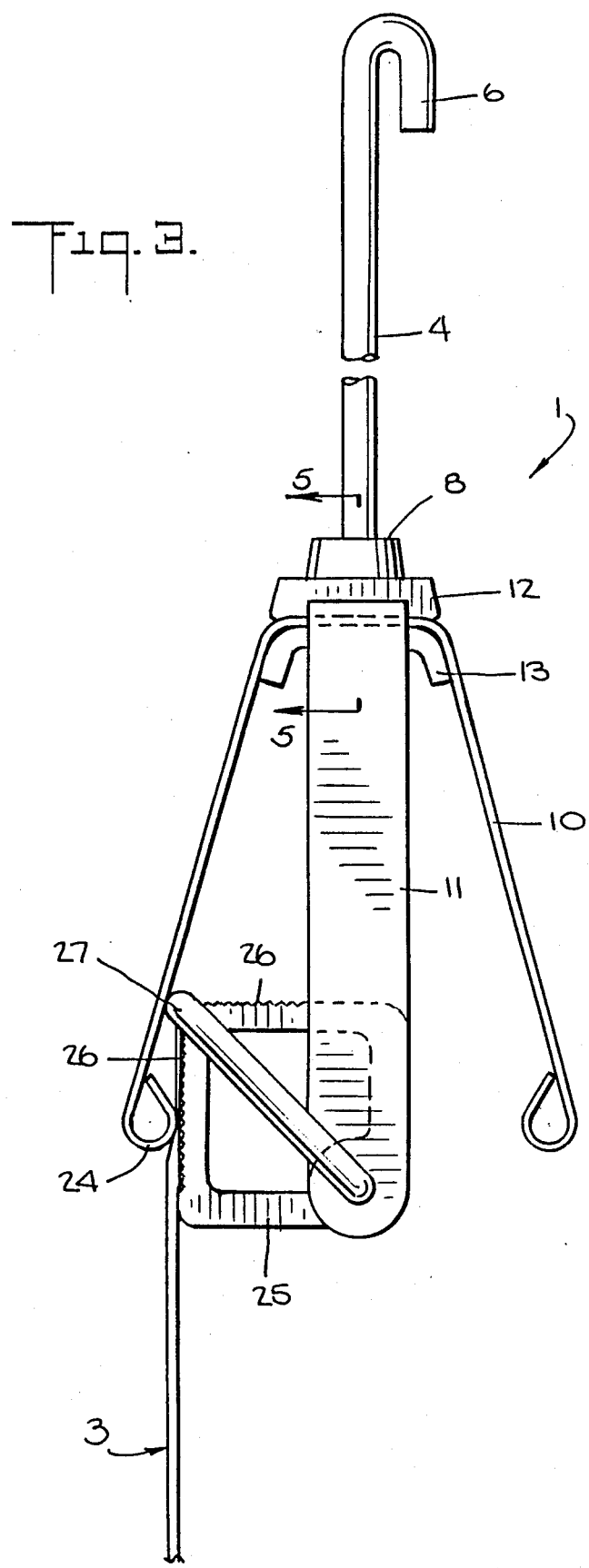
FIG. 3 is a side view of the peg in FIG. 1, as seen from the left.

With reference to FIGS. 3, plates 10 have a cylindrical finish at the bottom end 24 making it possible for the rectangular prism 25 to slip on the plates. As the plates move from their normal position, they are able to clamp trousers of different thicknesses.

The rectangular prism 25 has two roughened surfaces 26 in order to increase friction with the trousers, thus improving the clamping.

The rectangular prism 25 is joined to the body of the peg by means of the handles 27. The handles 27 are united with the rectangular prism 25 and are placed in the two circular bores 28 in the rectangular prism 25 and joined with two pins 29. See FIG. 2.

The handles 27 are housed in the two holes 30 in the strips 11 so that the rectangular prism 25 can tilt manually as a result of the operation of the handles.

The trousers are loaded by placing the end of the garment a few centimeters into the area between the rectangular prism 25 and the end 24 of the plates 10. The prism is then tilted by means of the handles 27 towards the trousers, and the trousers are thus secured in the peg.

Under its own weight, the garment tends to tip the prism 25 in the same direction, thus increasing the pressure on the trousers and improving the clamp.

In order to release the garment, the prism is tipped with the handles 27 in the opposite direction to that of the load, and the trousers are removed.

In order to reverse the trouser, its free end is passed through the end opposite the one where it was already held, and the prism 25 is tipped, using the handles 27, to that side. In this way, the garment is released at the clamped end and clamped at the free end, in a single operation.

Although preferred embodiments of the present invention have been described in detail, it is understood that modifications may be made by one skilled in the art, all within the spirit and the scope of the present invention as defined in the claims.

What is claimed:

1. A peg for an overhead conveyor used in a pressing process for conveying a workpiece from one work station to another, said peg comprising:
    an elongated rigid base member having a first end and a second end;
    an inverted V-shaped plate member mounted at its top to said base member between the first and second end thereof, said mounted inverted V-shaped plate member having a first leg and a second leg extending downwardly from said base member;
    a first strip member mounted to the first end of said base member and extending downwardly therefrom;
    a second strip member mounted to the second end of said base member and extending downwardly therefrom;
    an elongated rectangular prism member disposed within said first and second legs of said V-shaped plate member and extending substantially parallel to said base member, said rectangular prism member having a first contact surface defined by one surface thereof and a second contact surface defined by an adjacent second surface thereof;
    means mounting said elongated prism member to said first and second strip members for selectively tilting said first contact surface adjacent said first leg of said V-shaped plate member and said second contact surface adjacent said second leg of said V-shaped plate member; and
    means connected to said base member for mounting said peg to said overhead conveyor.

2. The peg of claim 1 wherein said inverted V-shaped plate member comprises two inverted V-shaped plate members each mounted at its top to said rigid base member, each having a first leg and a second leg extending downwardly from said base member, one said V-shaped plate member being located near the first end of said base member and another said V-shaped plate member being located near the second end of said base member.

3. The peg of claim 2 wherein said means for mounting said peg to said overhead conveyor includes a cylindrical rod having a hook at one end thereof for connection to said overhead conveyor.

4. The peg of claim 1 wherein said first and second contact surfaces of said rectangular prism member are serrated surfaces.

5. The peg of claim 3 wherein said cylindrical rod is connected to said base member by means for permitting said rod and said base member to rotate independently with respect to one another.

6. The peg of claim 5 wherein said means for permitting said rotation further provides for only one stable position.

7. The peg of claim 3 wherein said rigid base member comprises an upper elongated rigid member connected to a lower elongated rigid member.

* * * * *